United States Patent
Bagchi et al.

(10) Patent No.: US 12,375,958 B2
(45) Date of Patent: Jul. 29, 2025

(54) GENERATING TEST CASES TO TEST NF DEVICE IN WIRELESS NETWORK

(71) Applicant: Rakuten Symphony, Inc., Tokyo (JP)

(72) Inventors: Sandeep Bagchi, Bangalore (IN); Nayan Sen, Bangalore (IN)

(73) Assignee: RAKUTEN SYMPHONY, INC., Tokyo (JP)

(*) Notice: Subject to any disclaimer, the term of this patent is extended or adjusted under 35 U.S.C. 154(b) by 0 days.

(21) Appl. No.: 18/012,344

(22) PCT Filed: Dec. 16, 2022

(86) PCT No.: PCT/US2022/081774
§ 371 (c)(1),
(2) Date: Dec. 22, 2022

(87) PCT Pub. No.: WO2024/096916
PCT Pub. Date: May 10, 2024

(65) Prior Publication Data
US 2024/0224087 A1  Jul. 4, 2024

(30) Foreign Application Priority Data
Nov. 4, 2022  (IN) .............. 202241063022

(51) Int. Cl.
*H04W 24/08* (2009.01)
*H04L 43/50* (2022.01)
(52) U.S. Cl.
CPC ............. *H04W 24/08* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2007/0113274 A1 | 5/2007 | Hariharan et al. | |
| 2014/0092387 A1* | 4/2014 | Wagner | H04B 10/0731 356/402 |
| 2019/0230012 A1 | 7/2019 | Azizullah et al. | |
| 2020/0313999 A1 | 10/2020 | Lee et al. | |
| 2024/0045791 A1* | 2/2024 | Li | G06F 11/3684 |

OTHER PUBLICATIONS

International Search Report and Written Opinion for International Patent Application No. PCT/US22/81774 mailed Mar. 30, 2023.

* cited by examiner

*Primary Examiner* — Angela Nguyen
(74) *Attorney, Agent, or Firm* — Sughrue Mion, PLLC

(57) ABSTRACT

Embodiments are directed to a method for generating test cases to test a network function (NF) device in a wireless network by an electronic device (100). The method includes receiving, by the electronic device (100), at least one test specification associated with the NF device (200) under test and determining, by the electronic device (100), an intermediate schema of the at least one test specification, where the intermediate schema comprises a message portion and a procedure portion. The method also includes generating, by the electronic device (100), test criteria for packets received by the NF device (200) under test based on the intermediate schema of the at least one test specification and automatically generating, by the electronic device (100), a plurality of test cases based on the test criteria for testing a protocol conformity of the NF device (200).

20 Claims, 5 Drawing Sheets

GENERATING TEST CASES TO TEST NF DEVICE IN WIRELESS NETWORK

CROSS-REFERENCE TO RELATED APPLICATIONS

The present application claims priority to and is the 35 U.S.C. 371 United State National Phase application based on International Patent Application No. PCT/US22/81774, filed Dec. 16, 2022, and entitled "Generating Test Cases to Test NF Device in Wireless Network," which claims priority to Indian Patent Application number 202241063022 to Sandeep Bagchi et al., filed Nov. 4, 2022, and entitled "Generating Test Cases to Test NF Device in Wireless Network," and incorporates their disclosures herein by reference in their entireties.

FIELD OF INVENTION

The present disclosure relates to testing devices, and more specifically related to a method and electronic device for generating test cases to test network function (NF) device in wireless network.

BACKGROUND

In general, technical test specifications comprise hundreds of messages and thousands of lines of code. Each message may further comprise 10-100 information elements (IEs). Each of these IEs can further include data, optionality and type constraints. Testing all possible variations of the IEs for a single message may be very tedious. This makes the testing procedure very cumbersome and time consuming. Also, it is humanly not possible to generate so many variations of test cases and then further use the generated test cases to test a device under test (DUT).

A test case is a set of conditions or variables under which a tester determines whether the DUT functions as desired. The test cases are often referred to as test scripts or test automation code and are usually collected into test suites. In order to fully test the DUT requirements are met, usually at least two test cases (i.e., a positive test and a negative test) are needed for each requirement. Conventional method for generating the test cases uses natural language processing (NLP) techniques where the specifications are loaded and disassembled into component nouns and verbs that are used to locate potential matches. However, this technique has no regard to test criteria or rule set which may be used for test case generation.

Thus, it is desired to at least provide a mechanism for auto focus that is devoid of the above issues.

OBJECT OF INVENTION

The principal object of the embodiments herein is to provide a method and electronic device for generating test cases to test a network function (NF) device in a wireless network. The proposed method provides the electronic device an ability to automatically create exhaustive test cases using a specification and also perform protocol testing.

SUMMARY

Accordingly, embodiments herein disclose a method for generating test cases to test a network function (NF) device in a wireless network by an electronic device. The method includes receiving, by the electronic device, at least one test specification associated with the NF device under test and determining, by the electronic device, an intermediate schema of the at least one test specification, where the intermediate schema comprises a message portion and a procedure portion. The method also includes generating, by the electronic device, test criteria for packets received by the NF device under test based on the intermediate schema of the at least one test specification; and automatically generating, by the electronic device, a plurality of test cases based on the test criteria for testing a protocol conformity of the NF device.

In an embodiment, the procedure portion of the intermediate schema of the at least one test specification comprises name of each procedure, name of each request objects and responses corresponding to each of the request objects, where the responses corresponding to each of the request objects comprises a list of: success responses and failure responses. The message portion of the intermediate schema of the at least one test specification comprises name of each message, an encoding type associated with each of the messages and fields associated with each of the messages comprising information element (IE).

In an embodiment, generating, by the electronic device, the test criteria for packets received by the NF device under test based on the intermediate schema of the at least one test specification includes generating, by the electronic device, the test criteria for each message in the message portion of the intermediate schema, where the test criteria for the packets indicates one of: a field of a message is present and valid, a field of a message is present and invalid and a field of a message is absent in the at least one test specification.

In an embodiment, automatically generating, by the electronic device, the plurality of test cases based on the test criteria for testing the protocol conformity of the NF device includes determining, by the electronic device, a plurality of requests associated with the procedure portion of the intermediate schema of the at least one test specification and extracting, by the electronic device, a set of matching requests from the data model for each message stored in the data model repository based on the test criteria, where the set of matching requests is one of valid request and a malformed request. The method also includes determining, by the electronic device, a corresponding response to the set of matching requests extracted from the data model; and automatically generating, by the electronic device, the plurality of test cases based on the set of matching requests and the corresponding response to the set of matching requests.

In an embodiment, the method further includes receiving, by the electronic device, a plurality of packets captured by the NF device operated on field, where the plurality of packets is in the protocol conformity to the test specification associated with the NF device and parsing, by the electronic device, the plurality of packets captured by the NF into a plurality of messages. The method also includes filtering, by the electronic device, the plurality of messages into a plurality of request-response pairs; decoding, by the electronic device, each of the request-response pairs of the a plurality of request-response pairs; and determining, by the electronic device, a match for each of the request-response pairs based on the criteria for the packets. Further, the method includes determining, by the electronic device, whether each of the request-response pairs is associated with one of a valid packet and an invalid packet; and displaying, by the electronic device, a message indicating one of the valid packet and the invalid packet at the NF device indicating the protocol conformity of the plurality of packets received at the NF device.

In an embodiment, the method further includes transmitting, by the electronic device, the generated plurality of test cases to the NF device. The method also includes determining, by the electronic device, the protocol conformity of the NF device based on at least one of an IE conformance, a payload conformance and a call flow conformance of the plurality of test cases transmitted to the NF device; and displaying, by the electronic device, a message indicating one of the protocol conformity of the NF device and an error in the NF device.

Accordingly, embodiments herein disclose an electronic device for generating test cases to test a network function (NF) device in a wireless network. The electronic device includes a memory, a processor, a communicator and a test management controller. The test management controller is configured to receive at least one test specification associated with the NF device under test and determine an intermediate schema of the at least one test specification, where the intermediate schema comprises a message portion and a procedure portion. The test management controller is configured to generate test criteria for packets received by the NF device under test based on the intermediate schema of the at least one test specification and automatically generate a plurality of test cases based on the test criteria for testing a protocol conformity of the NF device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
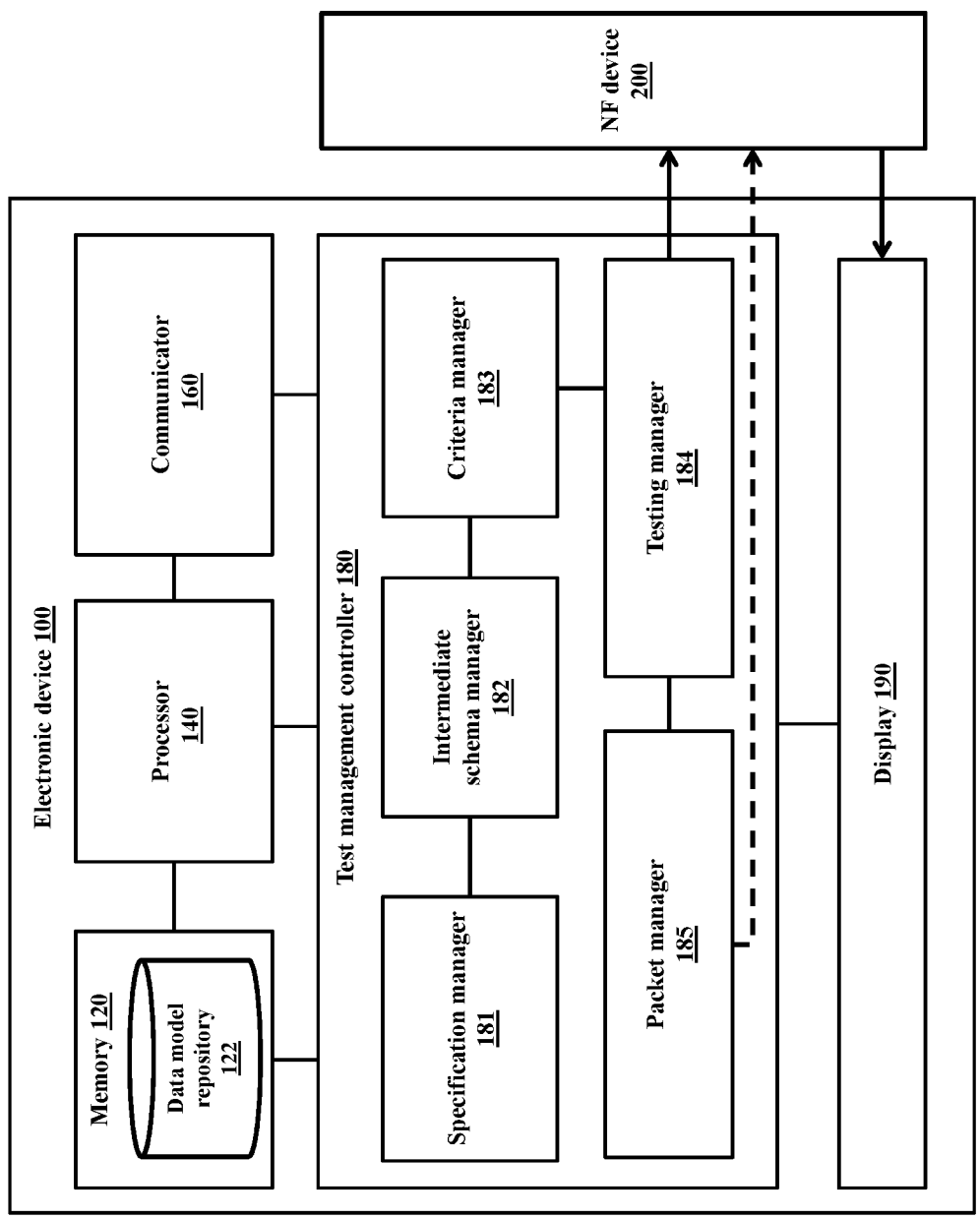
FIG. 1 illustrates a block diagram of an electronic device for generating test cases to test a network function (NF) device in a wireless network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for generating test cases to test a network function (NF) device in a wireless network by an electronic device. The method includes receiving, by the electronic device, at least one test specification associated with the NF device under test and determining, by the electronic device, an intermediate schema of the at least one test specification, where the intermediate schema comprises a message portion and a procedure portion. The method also includes generating, by the electronic device, test criteria for packets received by the NF device under test based on the intermediate schema of the at least one test specification; and automatically generating, by the electronic device, a plurality of test cases based on the test criteria for testing a protocol conformity of the NF device.

Accordingly, embodiments herein disclose an electronic device for generating test cases to test a network function (NF) device in a wireless network. The electronic device includes a memory, a processor, a communicator and a test management controller. The test management controller is configured to receive at least one test specification associated with the NF device under test and determine an intermediate schema of the at least one test specification, where the intermediate schema comprises a message portion and a procedure portion. The test management controller is configured to generate test criteria for packets received by the NF device under test based on the intermediate schema of the at least one test specification and automatically generate a plurality of test cases based on the test criteria for testing a protocol conformity of the NF device.

Referring now to the drawings, and more particularly to FIGS. 1 through 5, where similar reference characters denote corresponding features consistently throughout the figures, there are shown preferred embodiments.

FIG. 1 illustrates a block diagram of an electronic device (100) for generating test cases to test a network function (NF) device (200) in a wireless network, according to an embodiment as disclosed herein.

In an embodiment, the electronic device (100) includes a memory (120), a processor (140), a communicator (160), a test management controller (180) and a display (190). The test management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The FIG. 1 indicates the test management controller (180) out of the processor (140). However, the test management controller (180) can be incorporated within the processor (140) or as part of any other processor/processors or can in itself be a processor.

The memory (120) comprises a data model repository (122) which includes data models for each message. The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the test management controller (180). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the electronic device (100) and with external devices via one or more networks.

In an embodiment, the test management controller (180) includes a specification manager (181), an intermediate schema manager (182), a criteria manager (183), a testing manager (184) and a packet manager (185).

In an embodiment, the specification manager (181) is configured to receive at least one test specification associated with the NF device (200) under test. The test specification can be for example, but not limited to custom specification, OpenAPI specification and ASN1 specification. The test specification associated with the NF device includes definition of request-response messages, encoding scheme of the request-response messages and success or failure indication which can be used for determining the protocol conformity of the NF device (200).

In an embodiment, the intermediate schema manager (182) is configured to determine an intermediate schema of the at least one test specification by parsing the at least one test specification using a corresponding plugin. For example, the custom specification is parsed using a custom plugin. The intermediate schema includes a message portion and a procedure portion. The intermediate schema is the parsed representation of the messages and the procedures in the specification defined in a common format.

The procedure portion of the intermediate schema of the at least one test specification comprises name of each procedure, name of each request objects and responses corresponding to each of the request objects and the responses corresponding to each of the request objects includes a list of: success responses and failure responses. The message portion of the intermediate schema of the at least one test specification includes name of each message, an encoding type associated with each of the messages and fields associated with each of the messages comprising information element (IE).

In an embodiment, the criteria manager (183) is configured to generate the test criteria for each message in the message portion of the intermediate schema. The test criteria for the packets indicate one of: a field of a message is present and valid, a field of a message is present and invalid and a field of a message is absent in the at least one test specification. Further, the criteria manager (183) is also configured to generate a data model for each message in the message portion of the intermediate schema based on the test criteria and store the data model for each message in a data model repository (122) in the electronic device (100). The data model includes one instance of each message with requests and responses corresponding to each message, content of each message.

In an embodiment, the testing manager (184) is configured to determine a plurality of requests associated with the procedure portion of the intermediate schema of the at least one test specification and extract a set of matching requests from the data model for each message stored in the data model repository (122) based on the test criteria. The set of matching requests is one of valid request and a malformed request. The testing manager (184) is configured to determine a corresponding response to the set of matching requests extracted from the data model and automatically generate the plurality of test cases based on the set of matching requests and the corresponding response to the set of matching requests. Each of the plurality of test cases includes a data model, an expected response code and procedure to be executed for the test case.

Further, the testing manager (184) is configured to transmit the generated plurality of test cases to the NF device (200) and determine the protocol conformity of the NF device (200) based on at least one of an IE conformance, a payload conformance and a call flow conformance of the plurality of test cases transmitted to the NF device (200).

The testing manager (184) includes a codec (184*a*) and GLUE (184*b*). The codec (184*a*) converts the data model into the actual encoded byte stream dependent on the actual input specification. Also he codec (184*a*) processes the response received from the DUT (200) and validates the response against the data model. The GLUE (184*b*) is configured to provide connectivity towards the Device Under Test (DUT) or the NF device (200). The GLUE (184*b*) provides transport for the request payload to be sent towards the NF device (200).

In an embodiment, the packet manager (185) is configured to receive a plurality of packets captured by the NF device (200) operated on field and parse the plurality of packets captured by the NF into a plurality of messages. The plurality of packets is in the protocol conformity to the test specification associated with the NF device (200). Further, the packet manager (185) is configured to filter the plurality of messages into a plurality of request-response pairs, decode each of the request-response pairs of the plurality of request-response pairs and determine a match for each of the request-response pairs based on the criteria for the packets. The packet manager (185) is also configured to determine whether each of the request-response pairs is associated with one of a valid packet and an invalid packet and display a message indicating one of the valid packet and the invalid packet at the NF device (200) indicating the protocol conformity of the plurality of packets received at the NF device (200) on the display (190).

At least one of the plurality of modules/components of the test management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display (190) is configured to display a message indicating one of the valid packet and the invalid packet at the NF device (200) indicating the protocol conformity of the plurality of packets received at the NF device (200). The display (190) is also configured to display a message indicating one of the protocol conformity of the NF device (200) and an error in the NF device (200) while evaluating the packets captured by the NF device (200) while being operated on the field.

Although the FIG. 1 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function in the electronic device (100).

Figure 2:
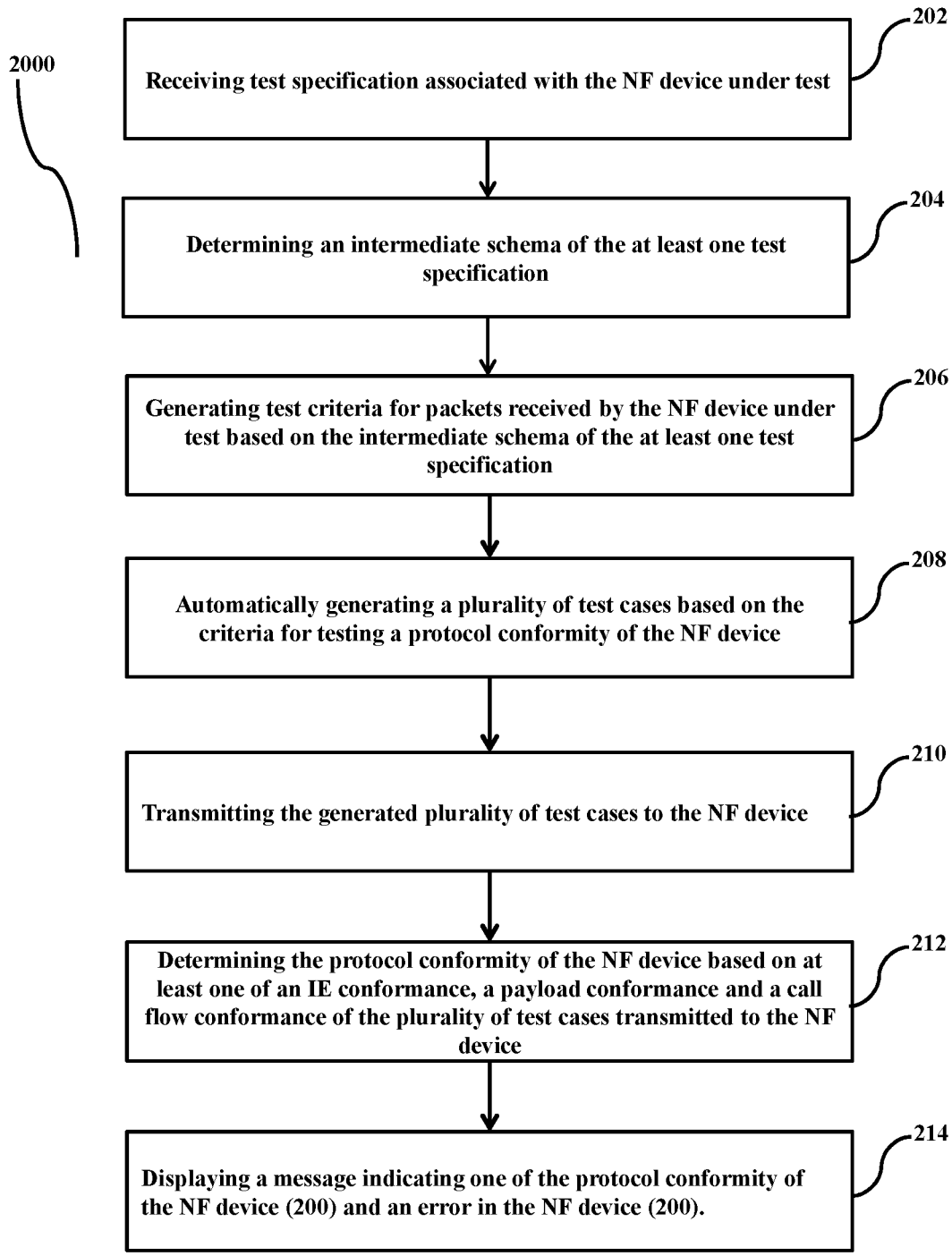
FIG. 2 is a flow diagram illustrating a method for generating the test cases to test the NF device in the wireless network by the electronic device, according to an embodiment as disclosed herein.

FIG. 2 is a flow diagram (2000) illustrating a method for generating the test cases to test the NF device (200) in the wireless network by the electronic device (100), according to an embodiment as disclosed herein.

Referring to the FIG. 2, at step 202 the method includes the electronic device (100) receiving the test specification associated with the NF device (200) under test. For example, in the electronic device (100) described in the FIG. 1, the test management controller (180) is configured to receive the test specification associated with the NF device (200) under test.

At step 204, the method includes the electronic device (100) determining the intermediate schema of the at least one test specification. For example, in the electronic device (100) described in the FIG. 1, the test management controller (180) is configured to determine the intermediate schema of the at least one test specification.

At step 206, the method includes the electronic device (100) generating the test criteria for the packets received by the NF device (200) under test based on the intermediate schema of the at least one test specification. For example, in the electronic device (100) described in the FIG. 1, the test management controller (180) is configured to generate the test criteria for the packets received by the NF device (200) under test based on the intermediate schema of the at least one test specification.

At step 208, the method includes the electronic device (100) automatically generating the plurality of test cases based on the criteria for testing the protocol conformity of the NF device (200). For example, in the electronic device (100) described in the FIG. 1, the test management controller (180) is configured to automatically generate the plurality of test cases based on the criteria for testing the protocol conformity of the NF device (200).

At step 210, the method includes the electronic device (100) transmitting the generated plurality of test cases to the NF device (200). For example, in the electronic device (100) described in the FIG. 1, the test management controller (180) is configured to transmit the generated plurality of test cases to the NF device (200).

At step 212, the method includes the electronic device (100) determining the protocol conformity of the NF device (200) based on the at least one of an IE conformance, a payload conformance and a call flow conformance of the plurality of test cases transmitted to the NF device (200). For example, in the electronic device (100) described in the FIG. 1, the test management controller (180) is configured to determine the protocol conformity of the NF device (200) based on the at least one of an IE conformance, a payload conformance and a call flow conformance of the plurality of test cases transmitted to the NF device (200).

At step 214, the method includes the electronic device (100) displaying the message indicating one of the protocol conformity of the NF device (200) and an error in the NF device (200). For example, in the electronic device (100) described in the FIG. 1, the test management controller (180) is configured to display the message indicating one of the protocol conformity of the NF device (200) and an error in the NF device (200).

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
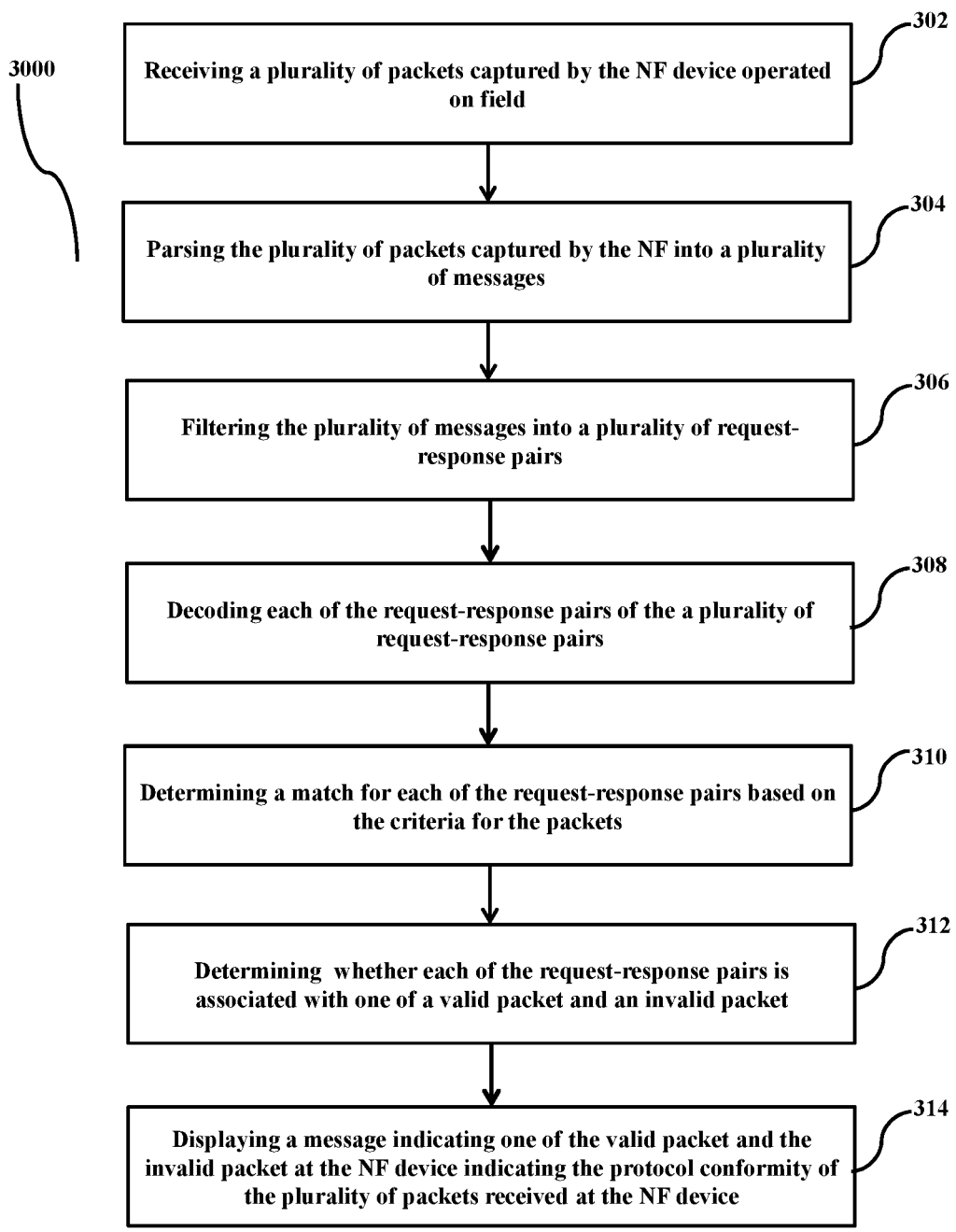
FIG. 3 is a flow diagram illustrating a method for using the generated the test cases to test the packets captured by the NF device using by the electronic device, according to an embodiment as disclosed herein.

FIG. 3 is a flow diagram (3000) illustrating a method for using the generated the test cases to test the packets captured by the NF device (200) using by the electronic device (100), according to an embodiment as disclosed herein.

Referring to the FIG. 3, at step 302 the method includes the electronic device (100) receiving the plurality of packets captured by the NF device (200) operated on the field. For example, in the electronic device (100) described in the FIG. 1, the test management controller (180) is configured to receive the plurality of packets captured by the NF device (200) operated on the field.

At step 304, the method includes the electronic device (100) parsing the plurality of packets captured by the NF device (200) into the plurality of messages. For example, in the electronic device (100) described in the FIG. 1, the test management controller (180) is configured to parse the plurality of packets captured by the NF device (200) into the plurality of messages.

At step 306, the method includes the electronic device (100) filtering the plurality of messages into the plurality of request-response pairs. For example, in the electronic device (100) described in the FIG. 1, the test management controller (180) is configured to filter the plurality of messages into the plurality of request-response pairs.

At step 308, the method includes the electronic device (100) decoding each of the request-response pairs of the plurality of request-response pairs. For example, in the electronic device (100) described in the FIG. 1, the test management controller (180) is configured to decode each of the request-response pairs of the plurality of request-response pairs.

At step 310, the method includes the electronic device (100) determining the match for each of the request-response pairs based on the criteria for the packets. For example, in the electronic device (100) described in the FIG. 1, the test management controller (180) is configured to determine the match for each of the request-response pairs based on the criteria for the packets.

At step 312, the method includes the electronic device (100) determining whether each of the request-response pairs is associated with one of the valid packet and the invalid packet. For example, in the electronic device (100) described in the FIG. 1, the test management controller (180) is configured to determine whether each of the request-response pairs is associated with one of the valid packet and the invalid packet.

At step 314, the method includes the electronic device (100) displaying the message indicating one of the valid packet and the invalid packet at the NF device (200) indicating the protocol conformity of the plurality of packets received at the NF device (200). For example, in the electronic device (100) described in the FIG. 1, the test management controller (180) is configured to display the message indicating one of the valid packet and the invalid packet at the NF device (200) indicating the protocol conformity of the plurality of packets received at the NF device (200).

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the invention.

Figure 4:
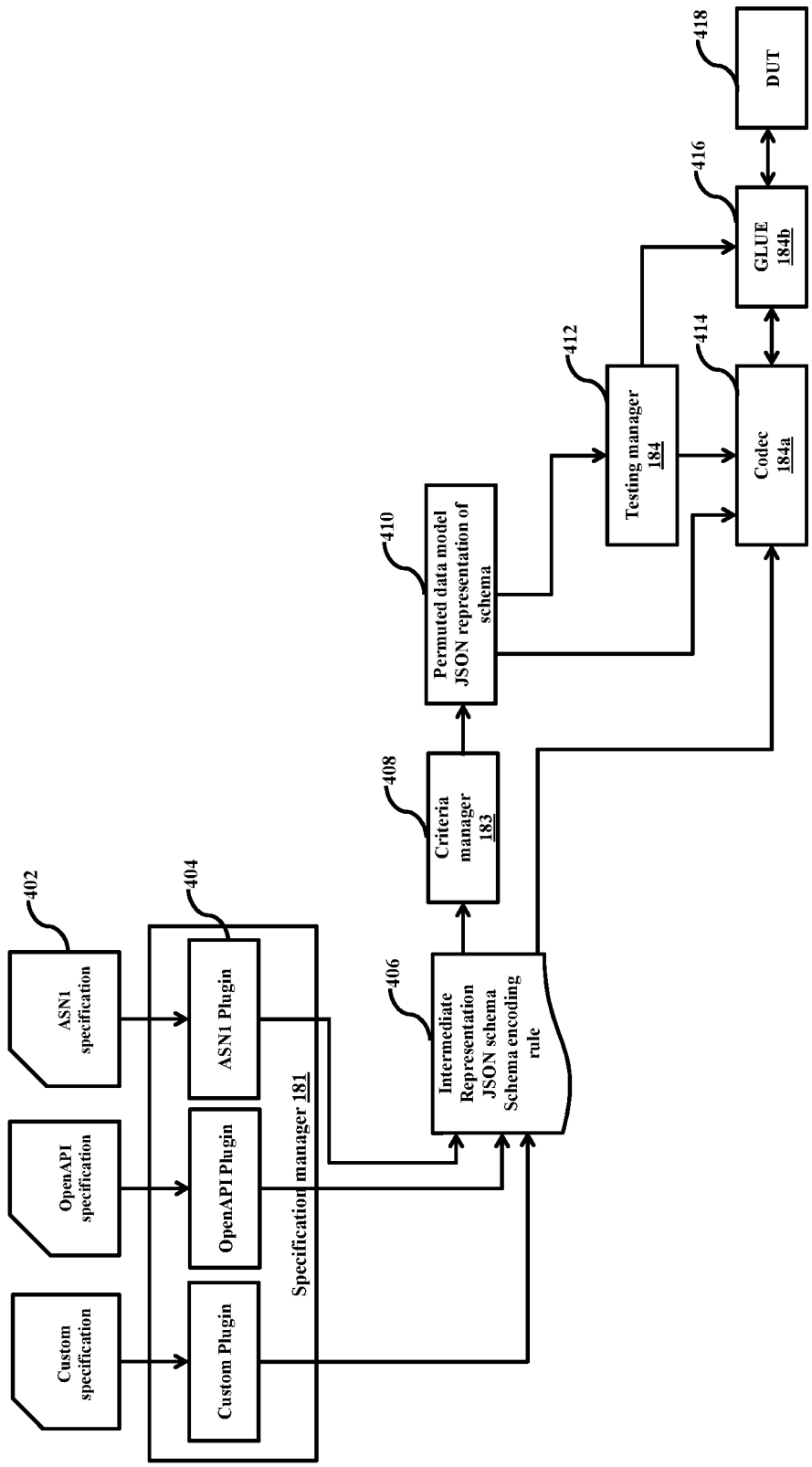
FIG. 4 is an example illustrating step-by-step procedure for generating the test cases to test the NF device in the wireless network, according to an embodiment as disclosed herein.

FIG. 4 is an example illustrating step-by-step procedure for generating the test cases to test the NF device (200) in the wireless network, according to an embodiment as disclosed herein.

Referring to the FIG. 4, at step 402, the electronic device (100) receives the specifications. The input specification includes:

a. Definition of request-response procedures, where request and response messages are defined.
 b. Encoding scheme of the request-response messages.
 c. Success or failure indication.

At step 404, the plugin that parses the input specification is tuned to each type of specification. Each plugin can parse the specification into a set of messages (requests and responses), procedures and expected success and failure codes or conditions for these procedures. This information is kept in the intermediate schema structure that is based on the JSON schema structure (as shown in step 406). The specification has two portions one for the data and the other for the procedure and the expected response codes.

Therefore, the intermediate schema is utilized for the generation of the criteria i.e., in a "RuleSetGeneration" stage to generate the criteria or the set of rules. The criteria help to create the data models of the requests and responses. The data models stored in the data model repository (122) to be fetched later by the test manager (184) when creating the test cases and executing them.

At step 412, the test manager (184) uses the portion of the specification that lists the procedures and finds the requests for that procedure. The test manager (184) extracts the set of matching request data (valid and malformed) from the data model repository (122). For the requests that are malformed, the test manager (184) expects the responses to be failure and for the requests that are valid and conforming it expects the responses to be success. This creates a set of test cases where the input is a message that is valid or malformed and the expected response is success or failure respectively.

The test manager (184) then uses the "GLUE" (184*b*) to execute the test case towards the DUT (200). The test manager (184) also uses an encoder (184*a*) for encoding the data model into byte stream. The encoder (184*a*) has information about encoding of each message and elements of each of the message. The "GLUE" (184*b*) provides the necessary transport facilities like http2, sctp and the relevant configuration required to establish connection with the DUT (200). The test manager (184) on having executed each of the test case waits for the response and then compares the response with the expected success or failure. If the response matches the expected success or failure, the test case is deemed to have passed else the test case is failed.

For extracting the response from the incoming byte stream a decoder (184*a*) is required which is also created from the intermediate schema. The decoder (184*a*) takes a byte stream from the glue (184*b*) and then converts the byte stream into the data model. Now each such response represented as the data model is then applied against the model list to check whether the response is a content validated response or not, i.e., even though the response code might be a success, the content of the response might still be garbage. This stage verifies that the content is valid and hence the entirety of the response is valid.

The above steps may be explained by considering an example specification i.e., an OpenAPI3.0 specification. The sample specification in OpenAPI3.0 format is as follows:

```
openapi: 3.0.0
info:
    version: "1.0.0"
    title: "Sample RPC"
    description: |
        Sample RPC specification
paths:
    /auth/token:
        post:
            requestBody:
                content:
                    application/x-www-form-urlencoded:
                        schema:
                            $ref: "#/components/schemas/AccessTokenReq"
                required: true
            responses:
                "200":
                    description: Successful Access Token Request
                    content:
                        application/json:
                            schema:
                                $ref: "#/components/schemas/AccessTokenRsp"
                "400":
                    description: Error in the Access Token Request
                    content:
                        application/json:
                            schema:
                                $ref: "#/components/schemas/AccessTokenErr"
components:
    schemas:
        AccessTokenErr:
            type: object
            required:
                - error
            properties:
                error:
                    type: string
                    enum:
                        - invalid_request
                        - invalid_client
                        - invalid_grant
                        - unauthorized_client
                        - unsupported_grant_type
                        - invalid_scope
                error_description:
                    type: string
                error_uri:
            type: string
        AccessTokenRsp:
            type: object
            required:
                - access_token
                - token_type
            properties:
                access_token:
                    type: string
                    description: JWS Compact Serialized representation of JWS signed JSON object
                    (AccessTokenClaims)
                    #no constraint ignore
                token_type:
                    type: string
                    enum:
                        - Bearer
                        - Flow
                expires_in:
```

-continued

```
                    type: integer
                    maximum: 500
                scope:
                    type: string
                    pattern: "^([a-zA-Z0-9_-]+)( [a-zA-Z0-9_-]+)*$"
        AccessTokenReq:
            type: object
            required:
                - grant_type
                - nfInstanceId
                - scope
            properties:
                tacs:
                    type: array
                    items:
                        type: integer
                        minimum: 200
                    minitems: 1
                plmnid:
                    $ref: "#/components/schemas/PlmnId"
                grant_type:
                    type: string
                    enum:
                        - client
                        - admin
                nfInstanceId:
                    $ref: "#/components/schemas/NfInstanceId"
                scope:
                    type: string
                    pattern: "^([a-zA-Z0-9_-]+)( [a-zA-Z0-9_-]+)*$"
                nftype:
                    type: string
                    enum:
                        - NRF
                        - AMF
                        - UPF
        Mnc:
            type: string
            pattern: '^\d{2,3}$'
        Mcc:
            type: string
            pattern: '^\d{3}$'
        PlmnId:
            type: object
            properties:
                mcc:
                    $ref: "#/components/schemas/Mcc"
                mnc:
                    $ref: "#/components/schemas/Mnc"
            required:
                - mcc
                - mnc
        NfInstanceId:
            type: integer
            minimum: 5
            maximum: 25
```

The input schema is converted to the intermediate specification. The intermediate specification contains two sections which includes the:
1. Message Portion: Section containing the constraints and definitions of the messages in the specification
2. Procedure Portion: Section containing the request/ response pairing along with the success and failure response codes.

The message portion of the intermediate specification is as follows:

```
{
    "specification": "CustomSpec.yaml",
    "type": "OpenAPI",
    "encoding": "JSON",
    "topLevelMessages": [
        "AccessTokenRequest",
        "AccessTokenRsp",
```

```
    "AccessTokenErr"
],
"messages": [
  {
    "name": "PlmnId",
    "fields": [
      {
        "name": "mcc",
        "type": "string",
        "optional": false,
        "constraints": {
          "allowedValues": null,
          "limits": null,
          "pattern": "^\\d{2,3}$"
        }
      },
      {
        "name": "mnc",
        "type": "string",
        "optional": false,
        "constraints": {
          "allowedValues": null,
          "limits": null,
          "pattern": "^\\d{3}$"
        }
      }
    ]
  },
  {
    "name": "AccessTokenRequest",
    "encoding": "JSON",
    "fields": [
      {
        "name": "tacs",
        "optional": true,
        "type": "array",
        "constraints": {
          "allowedValues": null,
          "limits": null,
          "pattern": null,
          "cardinality": {
            "alteast": 1,
            "atmost": null,
            "exact": null
          }
        },
        "item": {
          "type": "integer",
          "constraints": {
            "allowedValues": null,
            "limits": {
              "min": 200
            },
            "pattern": null
          }
        }
      },
      {
        "name": "nftype",
        "optional": true,
        "type": "string",
        "constraints": {
          "allowedValues": [
            "UPF",
            "AMF",
            "NRF"
          ],
          "limits": null,
          "pattern": null
        }
      },
      {
        "name": "grant_type",
        "optional": false,
        "type": "string",
        "constraints": {
          "allowedValues": [
            "client",
            "admin"
          ],
          "limits": null,
          "pattern": null
        }
      },
      {
        "name": "nfInstanceId",
        "optional": false,
        "type": "integer",
        "constraints": {
          "allowedValues": null,
          "limits": {
            "min": 0,
            "max": 25
          },
          "pattern": null
        }
      },
      {
        "name": "scope",
        "optional": false,
        "type": "string",
        "constraints": {
          "allowedValues": null,
          "limits": null,
          "pattern": "^([a-zA-Z0-9_-]+)( [a-zA-Z0-9_-]+)*$"
        }
      },
      {
        "name": "plmnid",
        "optional": true,
        "type": "PlmnId"
      }
    ]
  }
]
}
```

The intermediate specification is a JSON formatted representation where all the messages in the specification are represented. Each message has the following content:
1. Name: name of the message
2. Encoding: wire encoding used to encode the message into byte stream
3. Fields: The IEs that make up the message
4. TopLevelMessages: The list of messages that exist at the top level. These are the starting messages for a procedure.

Each field/IE includes a description of its own as provided below:
1. Name: name of the IE
2. Optionality: Whether the IE is mandatory or optional
3. Type: Each value of an IE can be either a string or a number. For IE that are of type array or other custom types, the intermediate spec. will contain the definition of those types and the data type will refer to that custom type name. Those underlying custom types will have similar recursive nature of definition of the fields.
4. Constraints: The content for that IE has constraints that can be of 5 broad categories:
   4.1 Allowed values: This constraint handles enumerations, or list of values that are applicable.
   4.2 Limits: For integer data type, minimum and maximum values of the field.
   4.3 Pattern: For string or bitstring types, a string regex pattern can be specified.
   4.4 Type: For IEs that don't define constraints on the content, the type itself will act as the constraint. For types such as integer, variations of integer sizes can act as type constraints, such as int8, int32, where they have different limits on the max and min values possible for these types.

4.5 Cardinality: Applicable for array types, the constraints can be at least N, at most N, exact N.

The procedure portion of the intermediate specification is as follows:

```
[
  {
    "Procedure": {
      "Name": "/auth/token",
      "Request": "AccessTokenRequest",
      "Responses": {
        "Success": [
          {
            "Code": 200,
            "Response": "AccessTokenRsp"
          }
        ],
        "Failure": [
          {
            "Code": 400,
            "Response": "AccessTokenErr"
          }
        ]
      }
    }
  }
]
```

The major content of the procedure portion of the intermediate schema is as follows:
1. Name: The name of the procedure. It could be path for http, or RPC name. It depends on the input specification.
2. Request: Name of the request object
3. Responses: It contains a list of success and failure responses along with their respective code. It also contains the response object, if any, as a part of the response.

The intermediate representation can now be used to generate the rule set and test cases. Therefore, the rules that are generated by the variation of 2 degrees of freedom which includes Present/Absent and Valid/Invalid.

The theory behind rule creation is that for every object/field that has optionality and constraints, three variations are possible:
1. present and valid,
2. present and invalid,
3. Absent.

Using three such variations of each parameter, all the cross product of the variations, rules are constructed for each message. So for N such fields in a message, maximum $3^N$ variations can be created. The logic is recursively applied for fields that have sub fields giving rise to large number of rules even for a single message.

For each message, all the fields are given a symbol. For e.g. for the message defined as:
AccessTokenRequest is denoted as M and then the fields are given symbols such as A, B, C etc.
Say "Scope"=A (mandatory)
"NfInstanceId"=B (mandatory)
"PlmnId"=C (optional)
Now for validity of the message AccessTokenRequest, Scope and NfInstanceId are mandatory, PLMNId is optional.
So, some of the rules that can be generated are like this:
R0: In message M,
   if A present and valid AND
   If B present and valid AND
   If C absent
   then message M is valid R1: In message M,
   if A present and valid AND
   if B absent AND
   if C present and valid
   then message M is invalid Now for complex IE "C", which contains internal fields, the validity of C will depend on the validity of the sub fields. These fields are also given symbols and the same rule logic to define the validity of the field C can be defined.
Consider fields of "C" are MCC=X(mandatory) and MNC=Y(mandatory)
R2: In type C
   If X is present and valid AND
   if Y is absent
   then type C is invalid
R3: In type C
   If X is present and valid AND
   If Y is present and valid
   Then type C is valid In order to generate the criteria for the packets or the rule set for the specification this logic is used across all the messages in the specification. Further, the data model is generated from the rule set. The data model is the JSON representation of the data that is to be encoded into the byte stream using the encoder. The data model represents one instance of the entire message along with the contents and whether some field is present or absent, and that the data is valid or not.

Sample data model is provided below:

```
{
  "model" : {
    "name": "AccessTokenRequest",
    "fields" : {
      "nfInstanceId": {
        "value" : "XYZ",
        "present" : true,
        "valid" : false
      },
      "scope": {
        "value" : "xyz",
        "present" : false,
        "valid" : true
      }
    }
  }
}
```

The generation of data set are based on the permutation of these basic 4 tenets.
1. Generate omitting mandatory parameters.
2. Generate with invalid values.
3. Generate with invalid sizes.
4. Generate with invalid type.

At this stage if the rule mentions that the data is valid, then the content of the data will be generated within the constraint bounds of the fields of the message. For invalid contents, variations of the cardinality, type, limits, allowedValues, pattern will be used to generate all invalid permutations. These permutations together are candidate invalid data. This set of valid and invalid data are kept in a repository to be used later. And for a rule which mentions that the data is invalid, randomly selected invalid data content is picked from the repository and then put in the data model, while setting the valid key as false. Similarly for the valid data, the valid key is set as true.

Special cases like allowedValues, the number of valid data is also multiple and in case of limits with minimum and maximum there are valid ranges of values and invalid ranges of values. In these cases, a plurality of such values will be chosen at random to define a set of valid values and invalid values.

For e.g. If the constraint is of type limits: {min: 0, max: 25}, say for the "NfInstanceId" then Valid set of values: {0, 1, 2, 6, 8, 9, 10, 24}

Invalid set of values: {−1, 28, 100}

Thus, even for validity there will be multiple such data models each having separate valid data, and for invalid data models there will be multiple such data models having separate invalid data.

Set of Valid data models, where the "NfInstanceId" is varied:

```
{
  "model" : {
    "name": "AccessTokenRequest",
    "fields" : {
      "nfInstanceId": {
        "value" : 1,
        "present" : true,
        "valid" : true
      },
      "scope": {
        "value" : "xyz 123",
        "present" : true,
        "valid" : true
      }
    }
  }
}
{
  "model" : {
    "name": "AccessTokenRequest",
    "fields" : {
      "nfInstanceId": {
        "value" : 5,
        "present" : true,
        "valid" : true
      },
      "scope": {
        "value" : "xyz 123",
        "present" : true,
        "valid" : true
      }
    }
  }
}
```

Set of invalid data models, where "NfInstanceId" is varied is provided below:

```
{
  "model" : {
    "name": "AccessTokenRequest",
    "fields" : {
      "nfInstanceId": {
        "value" : 28,
        "present" : true,
        "valid" : false
      },
      "scope": {
        "value" : "xyz 123",
        "present" : true,
        "valid" : true
      }
    }
  }
}
{
  "model" : {
    "name": "AccessTokenRequest",
    "fields" : {
      "nfInstanceId": {
        "value" : −1,
```

-continued

```
        "present" : true,
        "valid" : false
      },
      "scope": {
        "value" : "xyz 123",
        "present" : true,
        "valid" : true
      }
    }
  }
}
```

The test manager (184) refers to the procedures part of the specification and for the valid messages and the test manager (184) creates a mapping for the success codes as the expected response code. For the invalid messages, the test manager (184) creates a mapping to the failure codes as the expected response code.

Using the sum of all data models generated and the procedure specification, a set of test cases are generated. The test case includes the below mentioned three parts:

1. Data model: It will be either a valid or invalid data model.
2. Expected Response Code: Depending on whether the data model is valid, expected response will be either success or failure
3. Procedure: The procedure that is to be executed.

An example, for the test case where the request is invalid, and the expected response is failure:

```
{
  "model" : {
    "name": "AccessTokenRequest",
    "fields" : {
      "nfInstanceId":
        "value" : −1,
        "present" : true,
        "valid" : false
      },
      "scope": {
        "value" : "xyz 123",
        "present" : true,
        "valid" : true
      }
    }
  },
  "expected_response" : {
    "Failure": [
      {
        "Code": 400,
        "Response": "AccessTokenErr"
      }
    ]
  },
  "procedure" : "/auth/token"
}
```

An example, for a test case where the request is valid, and the expected response is success:

```
{
  "model" : {
    "name": "AccessTokenRequest",
    "fields" : {
      "nfInstanceId": {
        "value" : 5,
        "present" : true,
        "valid" : true
      },
      "scope": {
```

-continued

```
                "value" : "xyz 123",
                "present" : true,
                "valid" : true
            }
        }
    },
    "expected_response" : {
        "Success": [
            {
                "Code": 200,
                "Response": "AccessTokenRsp"
            }
        ],
    },
    "procedure" : "/auth/token"
}
```

For the first case the test manager (184) will wait for the response and expect the failure code as return. If the expected code and response code matches, then the test case are deemed as success, otherwise the test case is deemed as failure and the corresponding request and response are added to the test report. The test report is made available to the user at the end of the test session.

Figure 5:
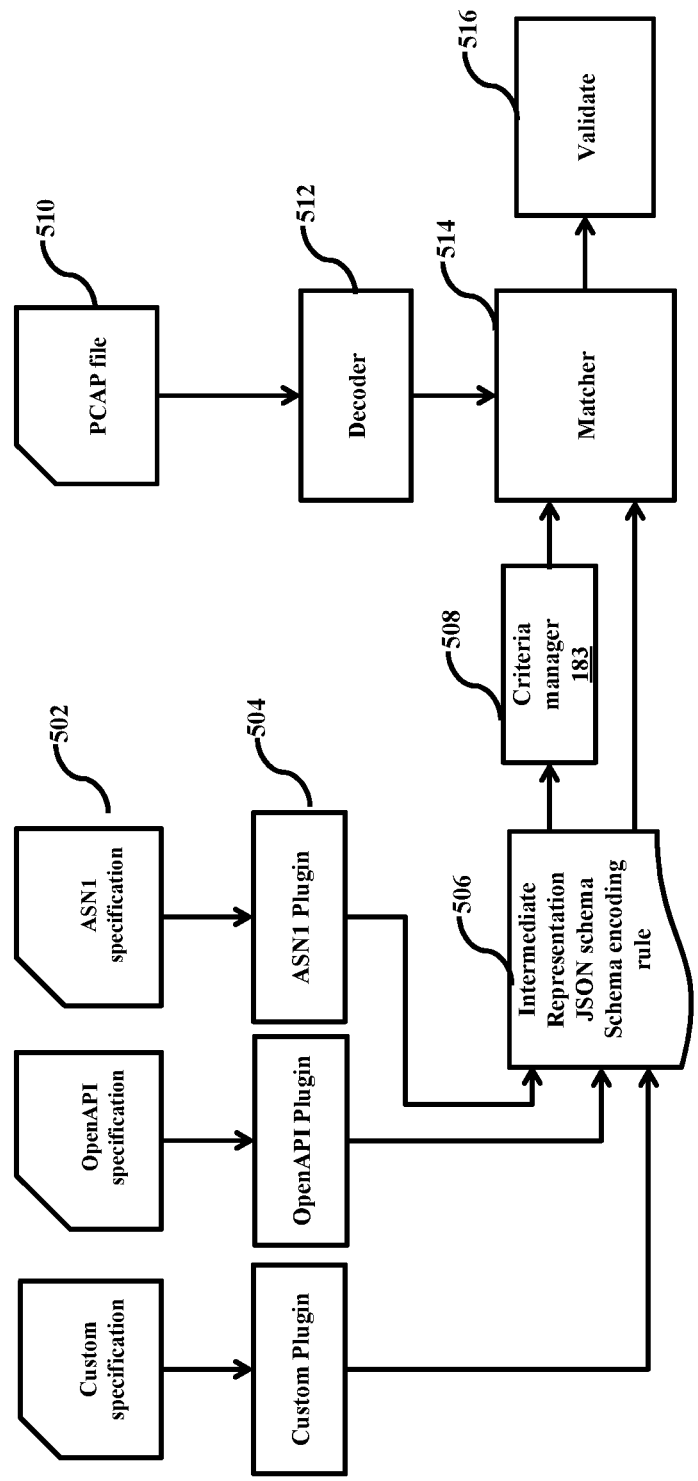
FIG. 5 is an example illustrating step-by-step procedure for evaluating packet capture of the NF device in the wireless network, according to an embodiment as disclosed herein.

FIG. 5 is an example illustrating step-by-step procedure for evaluating packet capture of the NF device (200) in the wireless network, according to an embodiment as disclosed herein.

Consider an on-filed NF device which has captured multiple packets. These packets are provided in a packet capture (PCAP) file and are available to the user for further processing such as detecting erroneous packets, etc. Referring to the FIG. 5, at step 502 the electronic device (100) receives the test specifications. At step 504, the electronic device (100) parses each of the test specifications using a corresponding plugin. At step 506, the electronic device (100) determines the intermediate representation of the test specifications in the form of JSON schema and the schema encoding rule is also determined.

At step 508, the criteria manager (183) generates the rule set or the criteria for the packets based on the received the test specifications. At step 510, the PCAP file is received by the packet manager (185) of the electronic device (100). For the parsing of packet captures, the packet manager (185) takes the input packet captures and parses the packets into messages. Further, the packet manager (185) uses the intermediate schema to sort the messages into requests and responses pairs. At step 512, a decoder within the packet manager (185) decodes the requests and responses into the data model representation. At step 514, the data model representation is passed through the rule set or the criteria for the packets and when an exact match is found with criteria, and then the corresponding result, invalid or valid is selected.

At step 516, in the procedure part of the schema, the expected response codes are selected based on whether the request has been deemed valid or invalid. Then the expected code and the received code are compared. If they match then the DUT responded correctly to the request. If the response data is invalid, then the DUT responded partially correct. When such errors are detected in the packet stream, the contents of the packets are dumped, with details about which message fields were found to be invalid or missing.

Therefore, in the proposed method once the criteria for the packets of the NF device (200) are determined then the method may be further expanded by using the criteria for the packets for many more applications such as in the above case to test the packets captured by the on-filed device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. An electronic device for generating test cases to test a network function (NF) device in a wireless network, wherein the electronic device comprises:
    a memory;
    a processor coupled to the memory;
    a communicator coupled to the memory and the processor; and wherein the processor is configured to:
        receive at least one test specification associated with the NF device under test;
        determine an intermediate schema of the at least one test specification, wherein the intermediate schema comprises a message portion and a procedure portion;
        generate test criteria for packets received by the NF device under test based on the intermediate schema of the at least one test specification; and
        automatically generate a plurality of test cases based on the test criteria for testing protocol conformity of the NF device.

2. The electronic device as claimed in claim 1, wherein the processor is further configured to:
    receive a plurality of packets captured by the NF device operated on field, wherein the plurality of packets is in the protocol conformity to the test specification associated with the NF device;
    parse the plurality of packets captured by the NF into a plurality of messages;
    filter the plurality of messages into a plurality of request-response pairs;
    decode each of the request-response pairs of the plurality of request-response pairs;
    determine a match for each of the request-response pairs based on the criteria for the packets;
    determine whether each of the request-response pairs is associated with one of a valid packet and an invalid packet; and
    display a message indicating one of the valid packets and the invalid packet at the NF device indicating the protocol conformity of the plurality of packets received at the NF device.

3. The electronic device as claimed in claim 1, wherein the processor is configured to automatically generate the plurality of test cases based on the test criteria for testing the protocol conformity of the NF device comprises:
    determine a plurality of requests associated with the procedure portion of the intermediate schema of the at least one test specification;
    extract a set of matching requests from the data model for each message stored in the data model repository based on the test criteria, wherein the set of matching requests is one of valid request and a malformed request;
determine a corresponding response to the set of matching requests extracted from the data model; and
automatically generate the plurality of test cases based on the set of matching requests and the corresponding response to the set of matching requests.

4. The electronic device as claimed in claim 1, wherein the processor is configured to generate the test criteria for packets received by the NF device under test based on the intermediate schema of the at least one test specification comprises:
generate the test criteria for each message in the message portion of the intermediate schema, wherein the test criteria for the packets indicates one of: a field of a message is present and valid, a field of a message is present and invalid and a field of a message is absent in the at least one test specification.

5. The electronic device as claimed in claim 4, wherein the processor is further configured to:
generate a data model for each message in the message portion of the intermediate schema based on the test criteria, wherein the data model comprises one instance of each message with requests and responses corresponding to each message, content of each message; and
store the data model for each message in a data model repository in the electronic device.

6. The electronic device as claimed in claim 1, wherein each of the plurality of test cases comprises a data model, an expected response code and procedure to be executed for the test case.

7. The electronic device as claimed in claim 1, wherein the processor is further configured to:
transmit the generated plurality of test cases to the NF device;
determine the protocol conformity of the NF device based on at least one of an IE conformance, a payload conformance and a call flow conformance of the plurality of test cases transmitted to the NF device; and
display a message indicating one of the protocol conformity of the NF device and an error in the NF device.

8. The electronic device as claimed in claim 1, wherein the intermediate schema of the at least one test specification is generated by parsing the at least one test specification using a corresponding plugin.

9. The electronic device as claimed in claim 1, wherein the procedure portion of the intermediate schema of the at least one test specification comprises name of each procedure, name of each request objects and responses corresponding to each of the request objects, wherein the responses corresponding to each of the request objects comprises a list of: success responses and failure responses.

10. The electronic device as claimed in claim 1, wherein the message portion of the intermediate schema of the at least one test specification comprises name of each message, an encoding type associated with each of the messages and fields associated with each of the messages comprising information element (IE).

11. A method for generating test cases to test a network function (NF) device in a wireless network by an electronic device, wherein the method comprises:
receiving, by the electronic device, at least one test specification associated with the NF device under test;
determining, by the electronic device, an intermediate schema of the at least one test specification, wherein the intermediate schema comprises a message portion and a procedure portion;
generating, by the electronic device, test criteria for packets received by the NF device under test based on the intermediate schema of the at least one test specification; and
automatically generating, by the electronic device, a plurality of test cases based on the test criteria for testing protocol conformity of the NF device.

12. The method as claimed in claim 11, further comprises:
receiving, by the electronic device, a plurality of packets captured by the NF device operated on field, wherein the plurality of packets is in the protocol conformity to the test specification associated with the NF device;
parsing, by the electronic device, the plurality of packets captured by the NF into a plurality of messages;
filtering, by the electronic device, the plurality of messages into a plurality of request-response pairs;
decoding, by the electronic device, each of the request-response pairs of the plurality of request-response pairs;
determining, by the electronic device, a match for each of the request-response pairs based on the criteria for the packets;
determining, by the electronic device, whether each of the request-response pairs is associated with one of a valid packet and an invalid packet; and
displaying, by the electronic device, a message indicating one of the valid packets and the invalid packet at the NF device indicating the protocol conformity of the plurality of packets received at the NF device.

13. The method as claimed in claim 11, wherein automatically generating, by the electronic device, the plurality of test cases based on the test criteria for testing the protocol conformity of the NF device comprises:
determining, by the electronic device, a plurality of requests associated with the procedure portion of the intermediate schema of the at least one test specification;
extracting, by the electronic device, a set of matching requests from the data model for each message stored in the data model repository based on the test criteria, wherein the set of matching requests is one of valid request and a malformed request;
determining, by the electronic device, a corresponding response to the set of matching requests extracted from the data model; and
automatically generating, by the electronic device, the plurality of test cases based on the set of matching requests and the corresponding response to the set of matching requests.

14. The method as claimed in claim 11, wherein generating, by the electronic device, the test criteria for packets received by the NF device under test based on the intermediate schema of the at least one test specification comprises:
generating, by the electronic device, the test criteria for each message in the message portion of the intermediate schema, wherein the test criteria for the packets indicates one of: a field of a message is present and valid, a field of a message is present and invalid and a field of a message is absent in the at least one test specification.

15. The method as claimed in claim 14, further comprises:
generating, by the electronic device, a data model for each message in the message portion of the intermediate schema based on the test criteria, wherein the data model comprises one instance of each message with requests and responses corresponding to each message, content of each message; and storing, by the electronic device, the data model for each message in a data model repository in the electronic device.

16. The method as claimed in claim 11, wherein each of the plurality of test cases comprises a data model, an expected response code and procedure to be executed for the test case.

17. The method as claimed in claim 11, further comprises:

transmitting, by the electronic device, the generated plurality of test cases to the NF device;

determining, by the electronic device, the protocol conformity of the NF device based on at least one of an IE conformance, a payload conformance and a call flow conformance of the plurality of test cases transmitted to the NF device; and displaying, by the electronic device, a message indicating one of the protocol conformity of the NF device and an error in the NF device.

18. The method as claimed in claim 11, wherein the intermediate schema of the at least one test specification is generated by parsing the at least one test specification using a corresponding plugin.

19. The method as claimed in claim 11, wherein the procedure portion of the intermediate schema of the at least one test specification comprises name of each procedure, name of each request objects and responses corresponding to each of the request objects, wherein the responses corresponding to each of the request objects comprises a list of: success responses and failure responses.

20. The method as claimed in claim 11, wherein the message portion of the intermediate schema of the at least one test specification comprises name of each message, an encoding type associated with each of the messages and fields associated with each of the messages comprising information element (IE).

* * * * *